United States Patent
Lu et al.

(10) Patent No.: US 8,397,080 B2
(45) Date of Patent: Mar. 12, 2013

(54) SCALABLE SEGMENT-BASED DATA DE-DUPLICATION SYSTEM AND METHOD FOR INCREMENTAL BACKUPS

(75) Inventors: Maohua Lu, Greenbelt, MD (US); Tzi-Cker Chiueh, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 211 days.

(21) Appl. No.: 12/846,817

(22) Filed: Jul. 29, 2010

(65) Prior Publication Data

US 2012/0030477 A1     Feb. 2, 2012

(51) Int. Cl.
*G06F 17/30* (2006.01)

(52) U.S. Cl. ........................................ 713/189; 707/692

(58) Field of Classification Search ................... 713/189
See application file for complete search history.

(56) References Cited

U.S. PATENT DOCUMENTS

| | | | |
|---|---|---|---|
| 2008/0244204 A1* | 10/2008 | Cremelie et al. ............. | 711/162 |
| 2009/0112945 A1 | 4/2009 | Camble et al. | |
| 2009/0182789 A1* | 7/2009 | Sandorfi et al. ............... | 707/204 |
| 2010/0042790 A1 | 2/2010 | Mondal et al. | |
| 2010/0058013 A1 | 3/2010 | Gelson et al. | |
| 2010/0064166 A1 | 3/2010 | Dubnicki et al. | |
| 2010/0122248 A1 | 5/2010 | Robinson et al. | |
| 2010/0318759 A1* | 12/2010 | Hamilton et al. ............. | 711/171 |
| 2011/0167221 A1* | 7/2011 | Pangal et al. .................. | 711/117 |
| 2011/0185133 A1* | 7/2011 | Reiter et al. ................... | 711/156 |
| 2011/0213754 A1* | 9/2011 | Bindal et al. .................. | 707/641 |

FOREIGN PATENT DOCUMENTS

| CN | 1746855 A | 3/2006 |
|---|---|---|
| CN | 101784996 A | 7/2010 |

OTHER PUBLICATIONS

Lillibridge et al, "Sparse indexing: large scale, inline deduplication using sampling and locality", in FAST '09: Proceedings of the 7th conference on File and storage technologies, pp. 111-123, 2009.

Zhu, Benjamin, Li Kai, Patterson and Hugo, "Avoiding the disk bottleneck in the data domain deduplication file system", in FAST'08: Proceedings of the 6th USENIX Conference on File and Storage Technologies, pp. 1-14, 2008.

Bhagwat, D.,Eshghi, K., Long, D. D. E., and Lillibridge, M., "Extreme binning: Scalable, parallel deduplication for chunk-based file backup", in Proceedings of the 17th IEEE international Symposium on Modeling, Analysis, and Simulation of Computer and Telecommunication Systems (MASCOTS 2009), 2009.

\* cited by examiner

*Primary Examiner* — Matthew Smithers
(74) *Attorney, Agent, or Firm* — Lin & Associates IP, Inc.

(57) ABSTRACT

A system in accordance with exemplary embodiments may provide a scalable segment-based data de-duplication for incremental backups. In the system, a master device on a secondary-storage node side may receive at least incremental changes, fingerprints, mapping entities, and distribute de-duplication functionality to at least a slave device, and performs data de-duplication on said plurality of segments via a way to cluster a plurality of fingerprints in a data locality unit called container for the incremental changes, varied sampling rates of a plurality of segments by having a fixed sampling rate for stable segments and by assigning a lower sampling rate for a plurality of unstable target files of de-duplication, and a per-segment summary structure to avoid unnecessary I/Os involved in de-duplication.

20 Claims, 10 Drawing Sheets

SCALABLE SEGMENT-BASED DATA DE-DUPLICATION SYSTEM AND METHOD FOR INCREMENTAL BACKUPS

TECHNICAL FIELD

The disclosure generally relates to a scalable segment-based data de-duplication system and method for incremental backups.

BACKGROUND

Most data de-duplication techniques focus on the full backups, where all logical blocks of a logical volume are de-duplicated with existing stored blocks even if only a small portion of all logical blocks have been changed.

In one known sparse indexing scheme, a sampling fingerprint index instead of a whole fingerprint index is used to fit the fingerprint index into RAM for a D2D data backup system. The insight of the sampled fingerprint index is that duplicated data blocks tend to be in a consecutive range with a non-trivial length. A match of sampling fingerprint values in the range indicates the matching of the whole range with a high probability. Among all matched ranges, a champion is chosen to be the de-duplication target. The sparse indexing scheme samples the fingerprints based on a fixed sampling rate. In another known scheme, fingerprints are sampled based on temporal locality of a segment, entries of a segment in the sparse chunk index are deleted or pruned if a criteria is met (a period of time, a fixed count). Each entry in the sampled fingerprint points to up to R containers. In other words, this scheme leverages a least recently used (LRU) list to reduce sampling rate of containers.

In another approach, a bloom filter is employed to determine if a fingerprint is not in the fingerprint index, which blindly records all fingerprints of all blocks regardless of the history of these blocks. Another known scheme is that each file has a whole-file hash, which means that a match of the whole-file hash indicates that the whole file is a duplicate or individual fingerprints do not need to be checked. In this approach, de-duplication is based on files. Each file has a representative fingerprint. Entries in the fingerprint index are distributed to K nodes one by one based on modular operation, or other distributed hash table functionality. The whole container corresponding to a fingerprint index entry is distributed to the same node as the fingerprint index entry. If two fingerprint index entries happen to have the same container but are distributed to two different nodes, the same containers are duplicated on two nodes. When a file is backed up, only the representative fingerprint is used to route the file to a node, all other fingerprints of the file are not used for routing purpose.

Some known US patents provide de-duplication techniques. For examples, in one prior art, fingerprint records of data blocks are distributed based on a portion of the fingerprint value. Fingerprint records have the full information for data de-duplication. There is no concept of fingerprint container. In another prior art, a modified version of a fixed prefix network (FPN) is used to distribute data blocks with a pre-defined data redundancy level. Because the storage is a content-addressable storage, there is no fingerprint index and containers. Yet in another prior art, blocks are distributed based on fingerprints. At the first step, blocks are divided into partitions based on k Least-Significant-Bit of the fingerprint key. At the second step, partitions are mapped to a physical node using a DHT. Each data node has a queue of encrypted keys, and a request searches the queue for duplicate discovery.

SUMMARY

The disclosed exemplary embodiments may provide a scalable segment-based data de-duplication system and method for incremental backups.

In an exemplary embodiment, the disclosed relates to a scalable segment-based data de-duplication system for incremental backups. The system comprises a master device on a secondary-storage node side. The master device may receive at least a plurality of incremental changes, a plurality of fingerprints of a plurality of segments to be de-duplicated, mapping entities from logical block address to physical location, and distribute at least a de-duplication functionality to at least a slave device on a data node side, and performs data de-duplication on the plurality of segments via a way to cluster a plurality of fingerprints in a data locality unit called container for the incremental changes, varied sampling rates for the plurality of segments, and a per-segment summary structure to avoid unnecessary input/outputs involved in de-duplication.

In another exemplary embodiment, the disclosed relates to a scalable segment-based data de-duplication method for incremental backups. The method comprises: clustering a plurality of fingerprints in a data locality unit called container for a plurality of incremental changes of a plurality of blocks to be de-duplicated; partitioning the plurality of incremental changes of the plurality of blocks as a plurality of input segments; querying an in-memory sampled fingerprint index for each fingerprint in each of the plurality of input segments, and returning with a corresponding pair of container and segment; when there is a stored segment which is the same as the input segment, then querying an in-memory segment-based summary with the corresponding pair of container and segment to determine if the corresponding container is fetched in, otherwise, querying an in-memory container store cache to determine if the corresponding container is cached; and loading the corresponding container from an on-disk container store when the container is not cached, and querying a per-container segment index for an offset of a particular fingerprint routed to the corresponding container in order to retrieve the segment information of the particular fingerprint.

The foregoing and other features, aspects and advantages of the present disclosure will become better understood from a careful reading of a detailed description provided herein below with appropriate reference to the accompanying drawings.

DETAILED DESCRIPTION OF THE EXEMPLARY EMBODIMENTS

Figure 1:
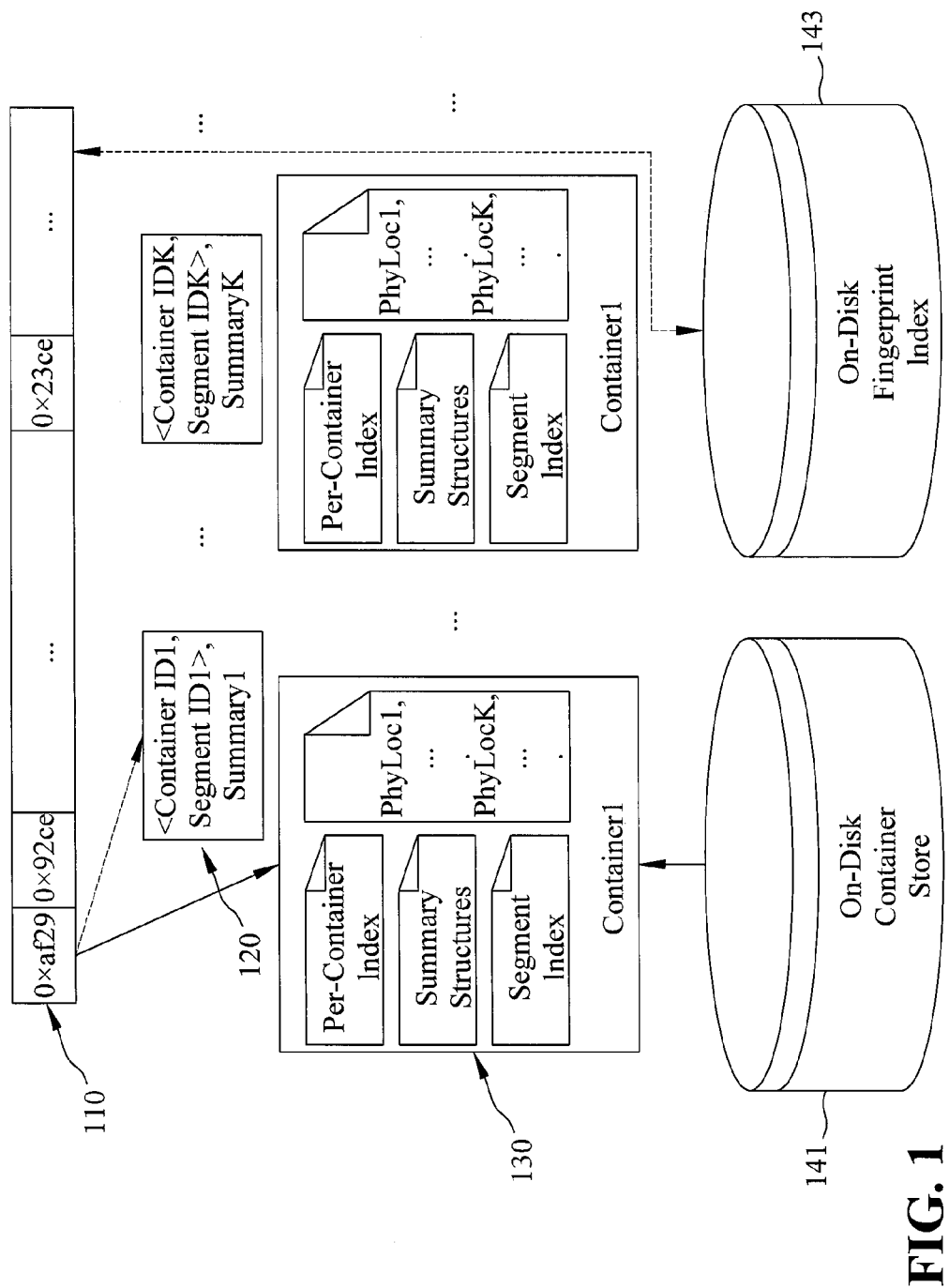
FIG. 1 shows an exemplary high-level data flow in a scalable segment-based data de-duplication system, consistent with certain disclosed embodiments.

The disclosed exemplary embodiments may provide a scalable segment-based data de-duplication system and method for incremental backups when a main storage system may incrementally track changed blocks and only backup those incremental changed blocks. In concrete, the main storage system may track changed blocks in a snapshot image since last snapshot (incremental change tracking), and only changed blocks are taken as input to the backup storage system.

The exemplary embodiments focus on four aspects to improve the de-duplication throughput with minimal impact on data de-duplication ratio (DDR) based on segment: (1) a way to cluster fingerprints in a data locality unit called container for incremental changes, (2) varied sampling rates of segments by having a fixed sampling rate for stable popular segments and by assigning a lower sampling rate for "unpopular" target files of de-duplication, (3) a per-segment summary structure to avoid unnecessary I/Os involved in de-duplication, and (4) distributed de-duplication to leverage computing power of participating storage nodes.

For the first aspect, containers are constructed based on the history of de-duplication instead of pure logical address proximity. For incremental changes as the input, the semantics of data locality is more subtle because it is hard to predict what could appear in the incremental change stream. In the exemplary embodiments, all incremental changes that share content with each other are put into the same container to capture the data locality due to changes by the same set of applications.

For the second aspect, sampling rates of segments are differentiated by having a fixed sampling rate for stable segments and by assigning a variable sampling rate for unstable targets of de-duplication when fitting fingerprints into a RAM. A stable segment is defined as a segment that does not change over de-duplication history. The intuition behind the stable segment is that hosts tend to share an object larger than a block. By observing the history of data de-duplication, it may pin-point the stable segment and use one fingerprint out of the stable segment to represent the segment in the fingerprint index. For example, a LRU policy may be adopted to vary the sampling rate of all unpopular segments in the sampled fingerprint index.

For the third aspect, per-segment summary structure may be leveraged to avoid unnecessary I/Os involved in de-duplication. For those segments with large sizes that rarely change, it is not necessary to compare individual fingerprints in a segment one by one, and therefore reduces the disk I/Os to fetch individual fingerprints from disks. The per-segment summary structure may be formed according to the principles: (1) A segment larger than a threshold has a whole-segment fingerprint, and (2) Match of whole-segment fingerprints indicates that no individual block fingerprints within the segment need to be checked. Related segments' whole-segment fingerprints may constitute a Merkle tree.

For the fourth aspect, the exemplary embodiments may distribute the de-duplication functionality to multiple participating storage nodes for distributed storage systems. Fingerprint index and containers are distributed and split to participating storage nodes based on the consistent hashing of the fingerprint. Also, the summary structure is also distributed and split to participating storage nodes based on a consistent hashing of the root summary.

For now, the exemplary embodiments of the scalable segment-based data de-duplication system may be implemented with HDFS as the underlying storage. However, the exemplary embodiments may work with any distributed storage systems with multiple data nodes. In the following discussion, HDFS is assumed to be the underlying storage layer. The exemplary embodiments may work with a secondary storage system. The scalable segment-based data de-duplication system may have a first component on the secondary server side to distribute the de-duplication workloads; and may further include a second component on the data node side to de-duplicate data blocks sent to that particular data node.

Before delving into the details of de-duplication, FIG. 1 shows an exemplary high-level data flow in the scalable segment-based data de-duplication system, consistent with certain disclosed embodiments. FIG. 1 omits the parallel portion of the scalable segment-based data de-duplication system, which may be found later.

Referring to FIG. 1, incremental changes are first partitioned as segments. Each segment queries an In-Memory Sampled Fingerprint Index (SFI) Cache 110 by issuing fingerprint query for each individual fingerprint in the segment. The query of each individual fingerprint returns with a pair of <containerID, segmentID>. Queries of fingerprints within the same segment are grouped to find out if a stored segment is the same with an input segment. If yes, the input segment queries an In-Memory Segment-based Summary 120 with the pair of <containerID, segmentID> to find if a container needs to be fetched in. Otherwise, the containerID is used to query an In-Memory Container Store Cache 130 to see if the container is cached. If the container is not cached, the container is loaded from an on-disk container store 141.

After the container is loaded, each input segment queries a per-container segment index in the container to find the offset of a fingerprint routed to this container. The offset may be used to retrieve physical locations of the block because fingerprints are stored as an array in the container. By querying the segment index using the offset, the segment information of that particular fingerprint may be retrieved. On-disk fingerprint index 143 consists of fingerprints that are evicted from SFI. On-disk fingerprint index 143 does not include all fingerprints of all containers.

The output of the data flow is physical locations of logical block addresses in the input segment if there exist duplicates. In concrete, a Change List of the Logical-To-Physical (L2P-CL) is generated as the output.

Segment is a basic unit in the scalable segment-based data de-duplication system, and may be determined by both the current input and the input history. In concrete, if several blocks are contiguous in incremental changes, these blocks belong to the same input segment. The input segment is then compared with stored segments to form the store segment. When the input segment and store segment conflict with each other, each fingerprint may belong to up to K segments. If there are more than K segments for a fingerprint, K≧2, the oldest segment is removed from the fingerprint.

Figure 2:
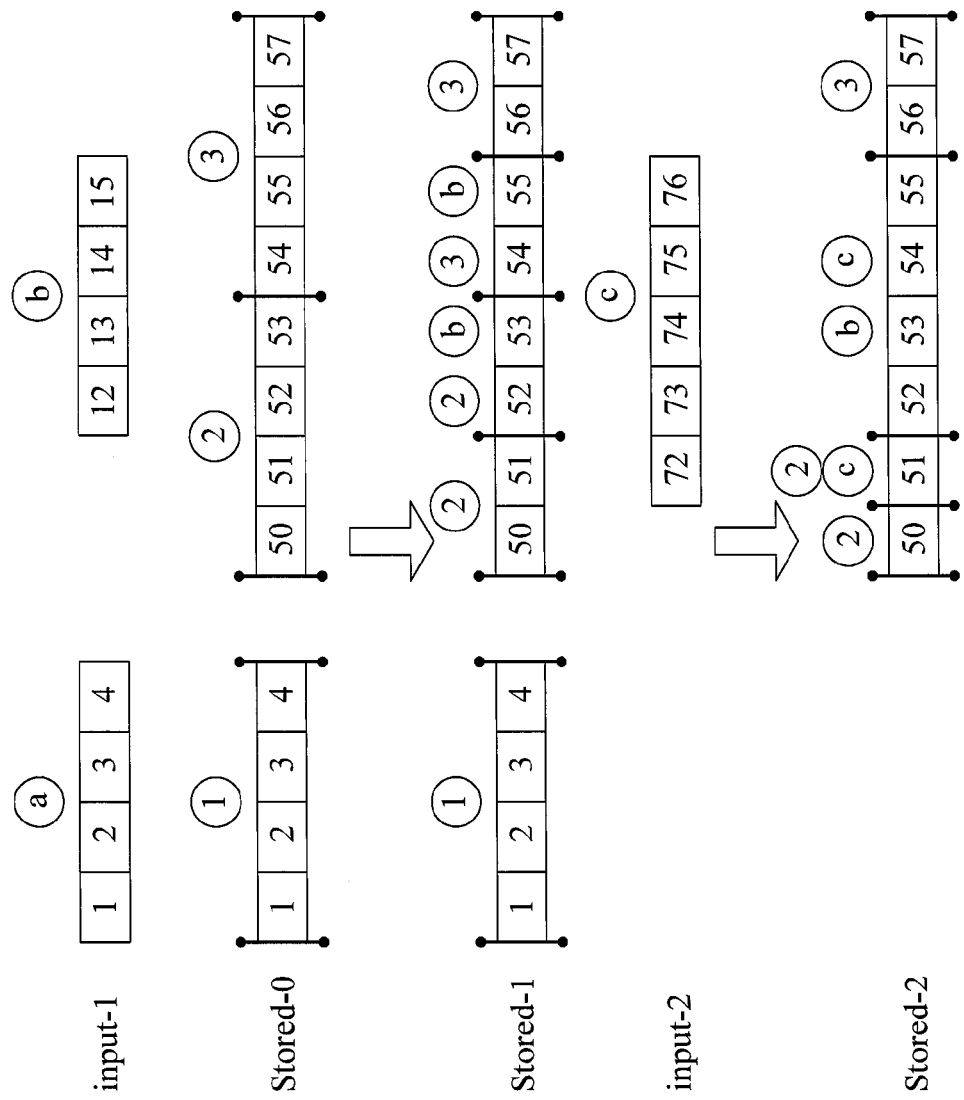
FIG. 2 shows an exemplary schematic view, illustrating how store segments evolve when K=2, consistent with certain disclosed embodiments.

FIG. 2 shows an exemplary schematic view, illustrating how store segments evolve when K=2, consistent with certain disclosed embodiments. Referring to FIG. 2, numbers in the input segment represent logical block numbers, while numbers in the store segment represent the fingerprint offset in a container. As input-1, there are two input segments, segment a and segment b. After de-duplication, segment a is found to be a duplicate of a store segment 1, but input segment b is found to span two store segments (store segment 2 and store segment 3). The store segment 1 and input segment a are the same so there is no change to the store segment 1. In contrast, fingerprints with offset from 52 to 55 map to two segments, store segment 2 and input segment b. Input segment c matches fingerprints 51 to 55. Because k=2, i.e. only 2 segments per fingerprint are allowed, store segment 2 (i.e. the oldest segment) is removed for fingerprints 52 to 55. Instead, fingerprints 52 to 55 map to two segments, i.e. input segment b and input segment c.

As a matter of fact, the disclosed exemplary embodiments allow up to K segments for each block, i.e. keep track of the last K segments that ever associate with a block. To keep track of the mapping from the logical block address range to the segment, an interval tree is employed, which is referred to as segment index (SI) in the following description.

A basic sharing unit (BSU) is defined as a store segment that does not get modified after its creation. For a basic sharing unit, because all fingerprints in it appear all at once, one fingerprint is enough to represent the corresponding BSU.

Because a fingerprint index cannot be fit into a RAM, the exemplary embodiments advocate the idea of sampling fingerprints to fit the fingerprint index into a fingerprint index cache. The sampling is based on individual segments. The fingerprint index cache may be implemented as, for example, a hash table. Each entry in the fingerprint index cache is keyed by a fingerprint value, and the entry contains one container ID, and the container ID may point to up to K (e.g., K=2) segment IDs if multiple containers share the same fingerprint. Note that this K is the same K as mentioned above.

In the disclosed exemplary embodiments, there may be two ways in varying the sampling rate of segments: (1) For segments that are BSUs, the first out of all fingerprints in a BSU is sampled to represent the BSU. Note that the sampling does not hurt the de-duplication ratio because fingerprints in a BSU always appear in one shot. However, the de-duplication throughput may be improved due to the saving of the memory space. (2) When the memory is out of space, instead of reducing the sampling rate of all segments, those segments that are not referenced for a long time reduce their sampling rates before being evicted when the sampling rate reaches a minimal value. An LRU list may be used for this purpose. In particular, BSU segments have a virtual sampling rate based on the LRU order. The virtual sampling rate is reduced when BSU reaches the end of the LRU list.

Container is meant to group fingerprints with data locality to amortize the I/O cost in loading a container. For incremental backups, data locality is different from that in full backups. The exemplary embodiments of the scalable segment-based data de-duplication system correlate segments based on de-duplication history. Initially, logical block addresses from different logical volumes comprise a unified pseudo logical block address by combining logical volume id with the logical block address. For example, for logical block address 500 in logical volume 1, the pseudo logical block address is (1, 500). To accommodate future updates for the container, each container may be initially half full. As the de-duplication history accumulates over time, segments sharing at least a single fingerprint with a store segment are put into the same container as the store segment.

Figure 3:
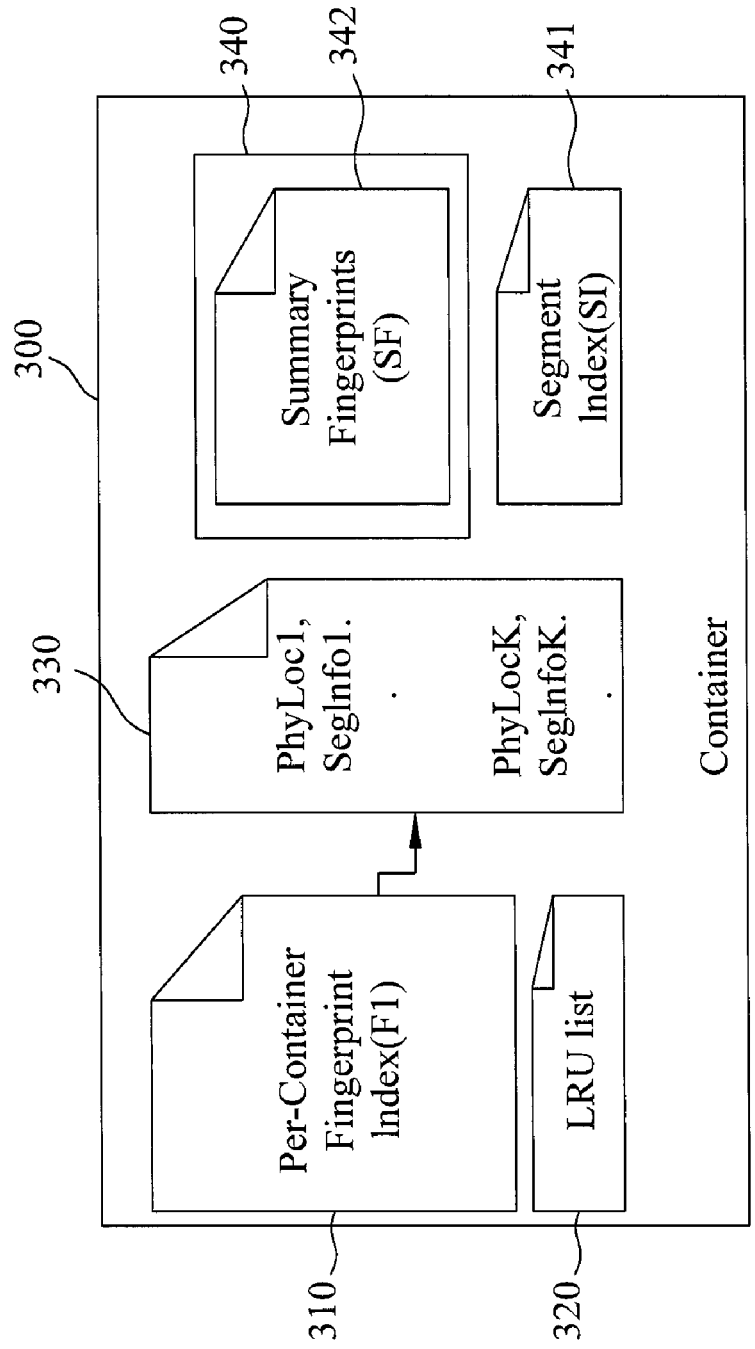
FIG. 3 shows an exemplary schematic view illustrating the content of a container, consistent with certain disclosed embodiments.

FIG. 3 shows an exemplary schematic view illustrating the content of a container, consistent with certain disclosed embodiments. In FIG. 3, the content of a container 300 may include a per-container fingerprint index 310, K pairs of physical locations of logical block addresses and information of store segments 330, and a summary structure 340. The per-container fingerprint index 310 organizes the fingerprints of the same container into a hash table to speed up the look of the fingerprint value in the container. Each fingerprint points to the latest K (e.g., K=2) segments. The intuition is that (1) the latest K segments are the ones most likely to be the basic sharing unit in the future if there is any basic sharing, and (2) it is very unlikely that two segments accidentally share a few intermittent fingerprints but not a whole segment. Note that this K is the same as the limit mentioned above.

An LRU list 320 is maintained for container 300 so that container 300 gets split based on the access history when a container needs to be split. Each LRU entry is keyed by the timestamp, and contains the fingerprint value as the content.

As described above, the relationship of segments in a container may be categorized into two types. The first type is two segments are within the same pseudo logical block address range; and the second type is two segments share fingerprints. If no summary information is provided, fingerprints of these two segments could be placed in the container based on an LRU order. Because per-segment summary structures are included, it needs to distinguish between these two types.

For segments of first type, each segment is not further processed and is directly kept in the container. For segments of second type, segments may need to be split based on the history because each fingerprint may only have up to K (e.g., K=2) segments. If a fingerprint points to more than K segments as a result of the inter-segment fingerprint sharing, the oldest segment is removed before a new segment is added.

All per-segment structures are put into the summary structure 340. Each entry in the summary structure 340 is keyed by a segment index (SI) 341, and its content consists of the summary fingerprint (SF) 342 of the corresponding segment. Note that not all segments have a summary fingerprint, only those segments with a larger size (e.g., larger than 1000) have a summary fingerprint so that all summary structures may fit into RAM.

A container may be based on a pseudo-physical block address, neither the logical block address, nor the real physical block range. Pseudo-physical block address preserves the locality in per-volume logical block address, and it also differentiates block addresses from different volumes. For example, for two volumes, volume A has the logical block range (0, 32M), volume B has the logical block range (0, 16M). The pseudo-physical block range for volume A may be (0, 32M), and the pseudo-physical block range for volume B may be (32M, 48M). A container may be based on the content of two segments. Two segments share at least one fingerprint may be put into one container. Also, a container preserves the locality in fingerprint index entries. In other words, the container is a range and content-based locality-preserved fingerprint container.

As stated above, a segment that is larger than a threshold N, has a summary fingerprint. The summary fingerprint may be computed by taking N fingerprints as the data content and computing a fingerprint for the content. In other words, the summary index is segment-based. Also, the property of a summary fingerprint is that a change in one of N fingerprints may change the summary fingerprint dramatically. As a result, if the summary fingerprints of two segments match with each other, the probability of the case that these two segments are different is diminishingly small to exist only in theory. In another word, if the summary fingerprints match, two segments are identical.

The segment-based summary index may fit into a memory, such as RAM, with a proper selection of N. Each index entry is keyed by a pair of <containerID, segmentID>. The content may include the summary fingerprint, the segment length, and physical blocks comprising the segment. The physical blocks are also stored because if the summary fingerprint matches, there is no need to fetch the container and these physical blocks serve as the target physical blocks for data de-duplication. As mentioned above, after querying the fingerprint index cache for a container, a containerID and up to K segmentIDs are retrieved. The resulting <containerID, segmentID> pair(s) is used to query the segment-based summary index to find out the corresponding segment, and the summary fingerprint of the resulting segment is compared with the summary fingerprint of a store segment. To reduce the memory consumption due to the segment-based summary index, not all physical blocks in the segment are stored individually. Instead, the physical block ranges may be stored to reduce the memory consumption.

Figure 4:
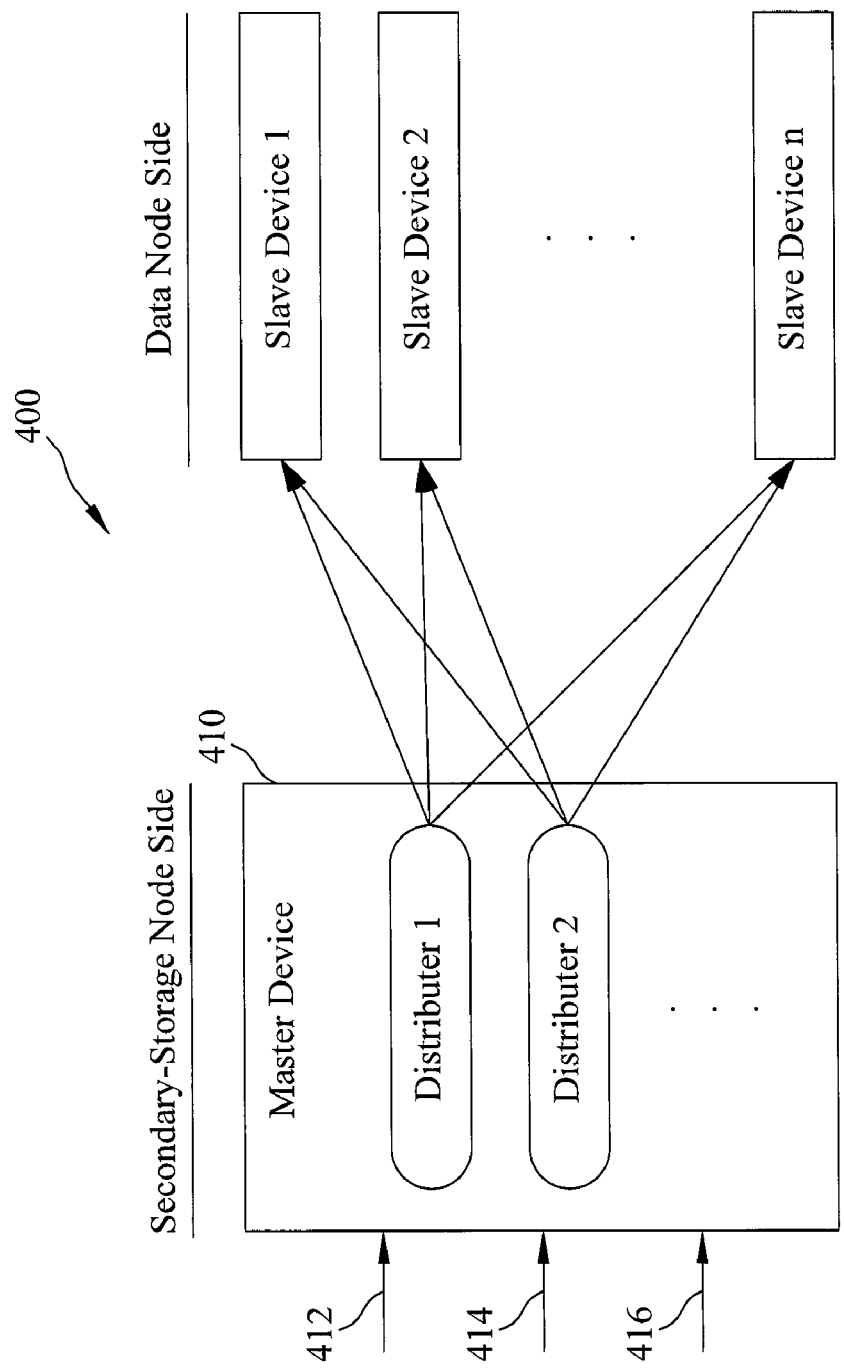
FIG. 4 shows an exemplary architecture of a scalable segment-based data de-duplication system for incremental backups, consistent with certain disclosed embodiments.

By combining the segment identification, variable sampling rates and the use of segment-based summary structure, FIG. 4 shows an exemplary architecture of a scalable segment-based data de-duplication system for incremental backups, consistent with certain disclosed embodiments. Referring to FIG. 4, a scalable segment-based data de-duplication system 400 may comprise a master device 410 on a secondary-storage node. The master device 410 may receive a plurality of inputs, such as incremental changes 412 of a plurality of blocks, fingerprints 414 of a plurality of segments to be de-duplicated, mapping entities 416 from logical block address to physical location and so on, and further include at least a distributer to distribute at least one de-duplication functionality to the at least a slave device, such as slave device 1~slave device n, and performs data de-duplication on the plurality of segments via a way to cluster fingerprints in a data locality unit called container for the incremental changes, varied sampling rates of segments by having a fixed sampling rate for stable popular segments and by assigning a lower sampling rate for target files of de-duplication, and a per-segment summary structure to avoid unnecessary inputs/outputs involved in de-duplication. System 400 may further include at least a slave device 420 on the data node side and performs parallel de-duplication to leverage computing power of the slave device on the data node side.

Figure 5:
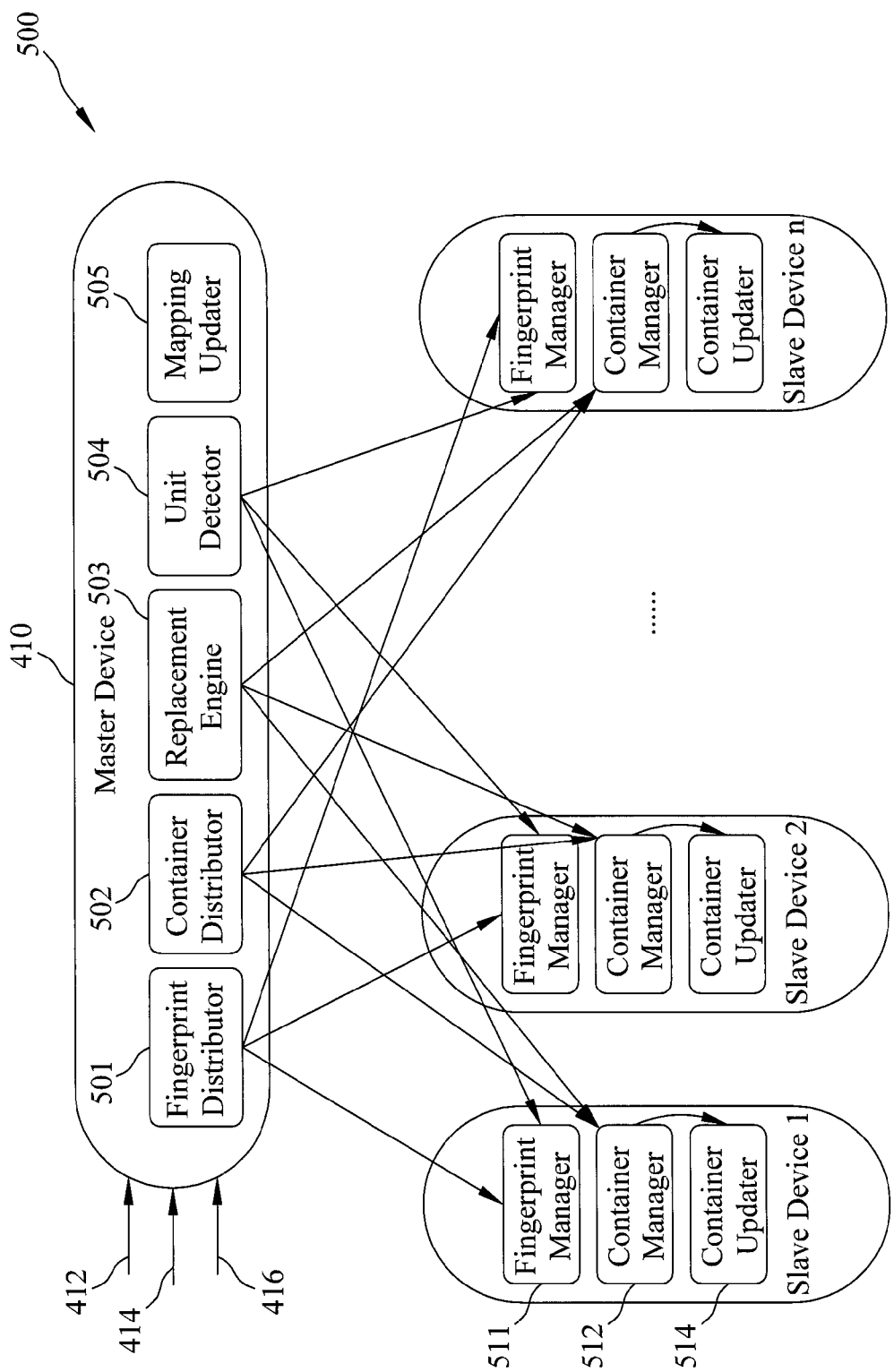
FIG. 5 shows an exemplary structure of distributed data de-duplication for the scalable segment-based data de-duplication system, consistent with certain disclosed embodiments.

FIG. 5 shows an exemplary structure of distributed data de-duplication for the scalable segment-based data de-duplication system, consistent with certain disclosed embodiments. Referring to FIG. 5, at the secondary-storage node side, master device 410 may include a fingerprint distributer 501 and a container distributer 502. Fingerprint distributer 501 may hash each individual fingerprint for determining a destination data node, and wait for a response from the data node. The response may be a target physical block pointed by a logical block address. Three cases are taken into consideration.

For the first case, the fingerprint has a hit in a fingerprint index cache, and the container is cached in a container cache or the segment-based summary index is hit. In this case, the response may include the information of a target block (the duplicate block). The original block corresponding to the target block may be disposed.

For the second case, the fingerprint has a hit in a fingerprint cache, but the container is not cached in a container cache and the segment-based summary index does not match. The container is loaded into a RAM of a secondary storage node. Entries in the container are distributed to related data nodes using the same hash function as that of distributing fingerprints by container distributor 502. Entries of the same container on a particular data node are organized as a sub-container.

Note that container distributor 502 does not write the container directly. Instead, container distributor 502 gives each sub-container on the data node a public filename so that sub-containers belonging to the same container may be retrieved together. For example, if a container has an identifier 0x01234, four sub-containers are named as 0x01234.ip1, 0x01234.ip2, 0x01234.ip3, and 0x0123444, respectively. When container distributor 502 retrieves container 0x01234, it asks each individual data node for corresponding sub-containers. Each data node in turn reads the sub-container 0x01234.ipI, where ipI is the IP address of that particular data node. The benefit of writing sub-containers on data nodes is that at the retrieval time, each sub-container has a local copy and the data node may retrieve the sub-container from its local disk instead of from other data nodes through network. The entry corresponding to the queried fingerprint may be extracted to get the target physical block by querying the per-container fingerprint index.

For the third case, the fingerprint does not have a hit in a fingerprint cache. The fingerprint is updated to a corresponding container. The original physical block is used as the target physical block.

Container distributor 502 may stripe a conceptual container as sub-files using the well-known consistent hash so that container stripes, the fingerprint cache and the container cache may reside on the same data node. Container distributor 502 is also responsible to distribute the segment summary based on the same consistent hashing of the summary fingerprint.

Master device 410 may further include a replacement engine 503 to store the LRU lists for fingerprint cache and container cache to replace containers and fingerprints centrally on master device 410. Note that the LRU list for fingerprint cache is based on container, not individual fingerprint.

Master device 410 may further include a unit detector 504 to detect the container of the input fingerprints on the fly or recognize the boundary of a de-duplication unit over time. Detecting the container of the input fingerprints may be proceeded as follows. For each input segment, initially there is no container corresponding to the input segment. If the de-duplication response indicates that the input segment belongs to a container, then the container is the corresponding container for the input segment. Otherwise, a new container is created to accommodate the input segment. A container has an upper bound on its size.

Recognizing the boundary of a de-duplication unit over time may be proceeded as follows. Initially each input segment is regarded as a de-duplication unit. The input segment is stored in a container. In concrete, each sub-container stores physical blocks as well as the input segment associated with these physical blocks. Next time the segment is queried, the input segment is checked against with the store segment. If the segment is the same, it is likely that the segment stays the same in the future. If a segment stays the same across a pre-defined number of de-duplication queries, the segment is regarded as stable and the first fingerprint in the unit may be picked up as the sampled fingerprint as mentioned above.

Master device 410 may further include a mapping updater 505 to update the mapping metadata (from logical block address to physical block address) of the volume based on the de-duplication output.

At the data node side, each of the at least a slave device may further include a fingerprint manager 511 for maintaining the fingerprint cache except the replacement of fingerprints. Replacement of fingerprints is coordinated by the replacement engine 503 on master device 410. Fingerprints are organized as a hash table. Each fingerprint entry has a container identifier list with up to K entries, the offset of the fingerprint within the container, and a pointer to fingerprints of the same container. With the pointer, all fingerprints of the same container are organized as a single linked list. The head of the linked list is the first sampled fingerprint of the container.

In the replacement engine 503, each entry of the LRU list for the fingerprint index consists of the fingerprint value of the first sampled fingerprint of the corresponding container, and the container identifier. While each entry of the LRU list for the container cache has the container identifier. When fingerprints of a container are evicted from the fingerprint index, these entries are written out to a disk as a persistent copy of the fingerprint index.

Each slave device may also include a container manager 512 for maintaining the container cache except the replacement of containers. Container manager 512 may have three parts, i.e. container cache, container format, and container reading. For the container cache, containers are organized as a hash table keyed with the unique container identifier the same as the container cache mentioned before. The container format is the same as the container format mentioned before and FIG. 3. For the container reading, it may read the sub-container from underlying file system with the ContainerID plus IP as the file name. Each slave device may also include a container updater 513 for writing of sub-containers on the local data node. To speed up the writing, updates are sequentially written to disk.

Figure 6:
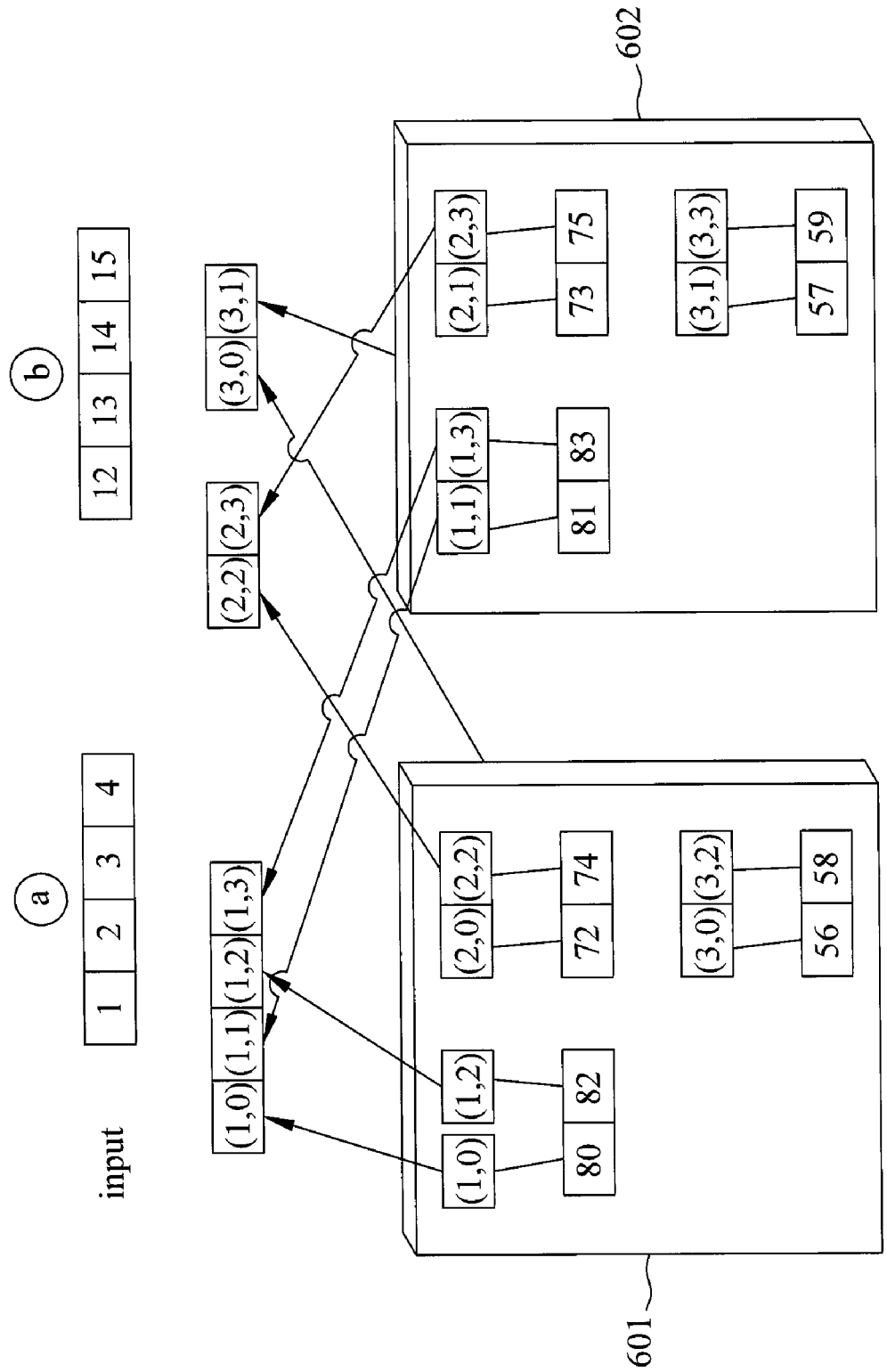
FIG. 6 shows an exemplary schematic view, illustrating how to reconstruct a segment from two participating nodes, consistent with certain disclosed embodiments.

Because containers are distributed on all participating nodes, the store segment information is not stored on a single node. Instead, the offset within a segment is stored on participating nodes. After all offsets and segmentIDs of a segment are collected from participating nodes, the information of store segment is re-constructed. FIG. 6 shows an exemplary schematic view, illustrating how to reconstruct a segment from two participating nodes, consistent with certain disclosed embodiments. The de-duplication is the same as that in FIG. 2. Segments 1, 2, and 3 all belong to the same container. The parenthesized pair (n,k) represents the $k^{th}$ physical block in the $n^{th}$ segment. For example, pair (2,3) represents the $3^{rd}$ physical block in the segment 2. Segments 1, 2, and 3 are distributed to two storage nodes, i.e. node 601 and node 602, evenly in the example. After querying the per-container fingerprint index, offsets and segmentIDs are returned from corresponding slave devices. On the master device, the matched portions of segments 1, 2 and 3 are reconstructed. For example, (1,0) and (1,2) from node 601 belong to segment 1, (1,1) and (1,3) from node 602 also belong to segment 1. And the whole segment 1 is reconstructed, where the $0^{th}$ and $2^{nd}$ blocks are from node 601, while the $1^{st}$ and $3^{rd}$ blocks are from node 602. And the segment identification scheme mentioned in FIG. 2 may continue.

Figure 7:
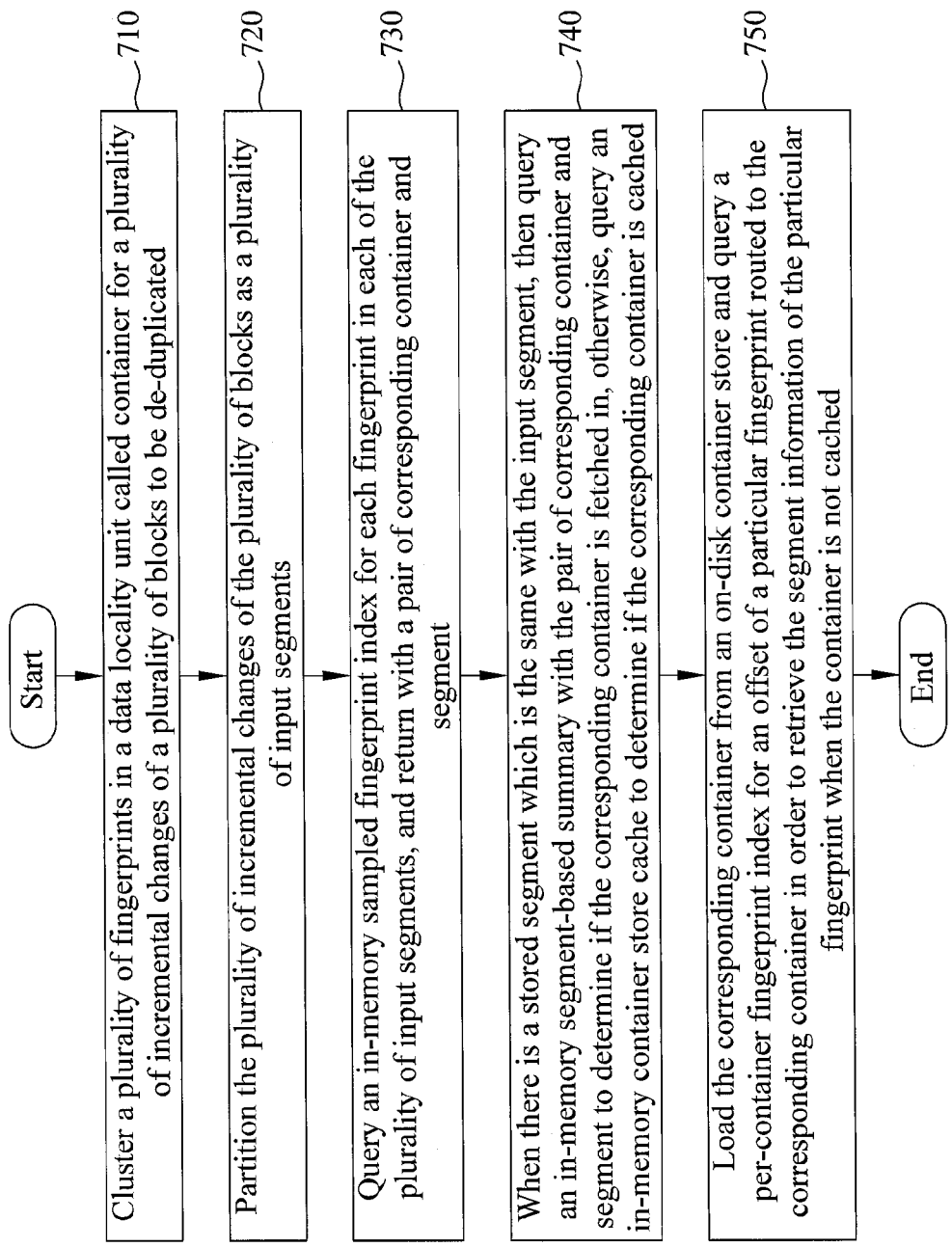
FIG. 7 shows an exemplary operation flow for a scalable segment-based data de-duplication system for incremental backups, consistent with certain disclosed embodiments.

Referring to FIG. 7, an exemplary operation flow for a scalable segment-based data de-duplication system for incremental backups is provided, which is consistent with certain disclosed embodiments. In FIG. 7, exemplary operation flow 700 may comprise: clustering a plurality of fingerprints in a data locality unit, i.e. container, for a plurality of incremental changes of a plurality of blocks to be de-duplicated (step 710); partitioning the plurality of incremental changes of the plurality of blocks as a plurality of input segments (step 720); querying an in-memory sampled fingerprint index, such as in-memory sampled fingerprint index 110, for each fingerprint in each of the plurality of input segments, and returning with a corresponding pair of container and segment (step 730), for example <containerID, segmentID>; when there is a store segment which is the same as the input segment, then querying an in-memory segment-based summary, such as in-memory segment-based summary 120, with the corresponding pair of container and segment to determine if the corresponding container is fetched in, otherwise, querying an in-memory container store cache, such as in-memory container store cache 130, to determine if the corresponding container is cached (step 740); and loading the corresponding container from an on-disk container store when the container is not cached, and querying a per-container fingerprint index for an offset of a particular fingerprint routed to the corresponding container for retrieving the segment information of the particular fingerprint (step 750). The output of the data flow is physical locations of logical block addresses in the input segment if there are duplicates.

Figure 8:
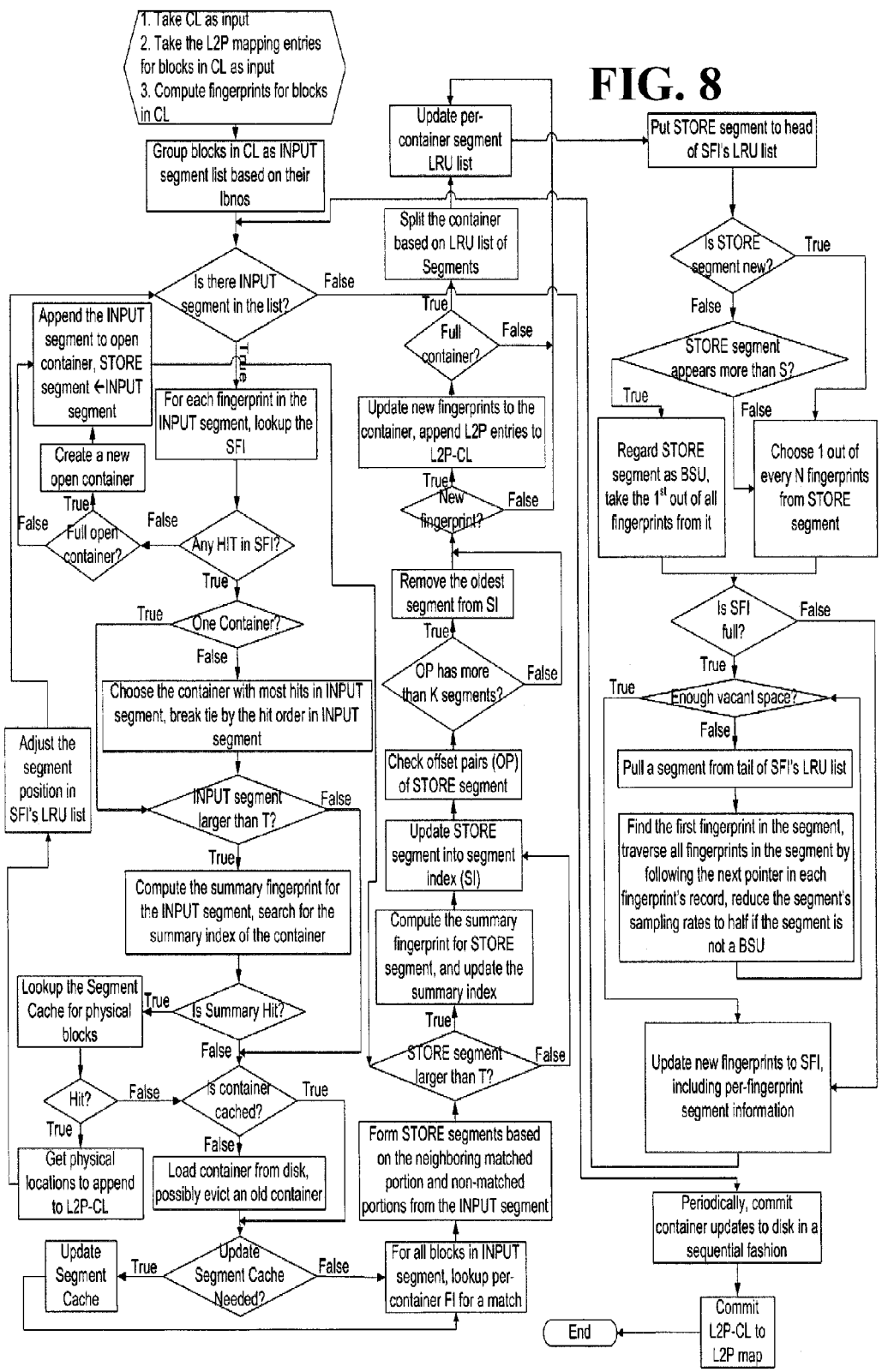
FIG. 8 shows a working example illustrating a detailed operation flow for FIG. 7, consistent with certain disclosed embodiments.

Step 710 may further include, for example, taking a change list (CL) as input, taking a plurality of logical-to-physical (L2P) mapping entries for blocks in the change list as input, computing a plurality of fingerprints for blocks in the change list, constructing containers based on the history of de-duplication to capture the data locality due to being changed by the same set of applications, and so on. When the input segment is larger than a threshold T, step 730 may further include, for example, computing a summary fingerprint index for the input segment, searching for a fingerprint index, looking up a segment cache for physical blocks, getting physical location to append to the change list, and so on. When a matched store segment is larger than the threshold T, step 740 may further include, for example, computing a summary fingerprint for the store segment and updating a summary index, checking an offset pair of the store segment, removing the oldest segment from segment index (each fingerprint entry may have a container identifier list with up to K entries), updating new fingerprints to the container, appending L2P entries to the change list, and so on. And after the container is cached, segment cache will be updated. Step 750 may further include, for example, creating a new open container when a full container is found, appending the input segment to the open container, committing container updates to disk in a sequential fashion, and so on. These detailed operating sub steps may be found in the working example of FIG. 8, which illustrates a detailed operation flow for FIG. 7, consistent with certain disclosed embodiments. Description for other detailed sub steps is already mentioned above and will be omitted here.

As mentioned above, scalable segment-based data de-duplication system 400 may work closely with a secondary storage system, and there are two kinds of devices of scalable segment-based data de-duplication system 400. One is on the secondary-storage side to distribute the de-duplication workloads; the other kind of devices is on the data node side to de-duplicate data blocks sent to that particular data node. Fingerprint containers may be stored and retrieved from a secondary-storage server on the secondary-storage side in a distributed fashion, and the fingerprint cache and container cache may be also distributed and partitioned in different data nodes. The container, fingerprint cache and container cache are all partitioned using a consistent hashing.

Figure 9:
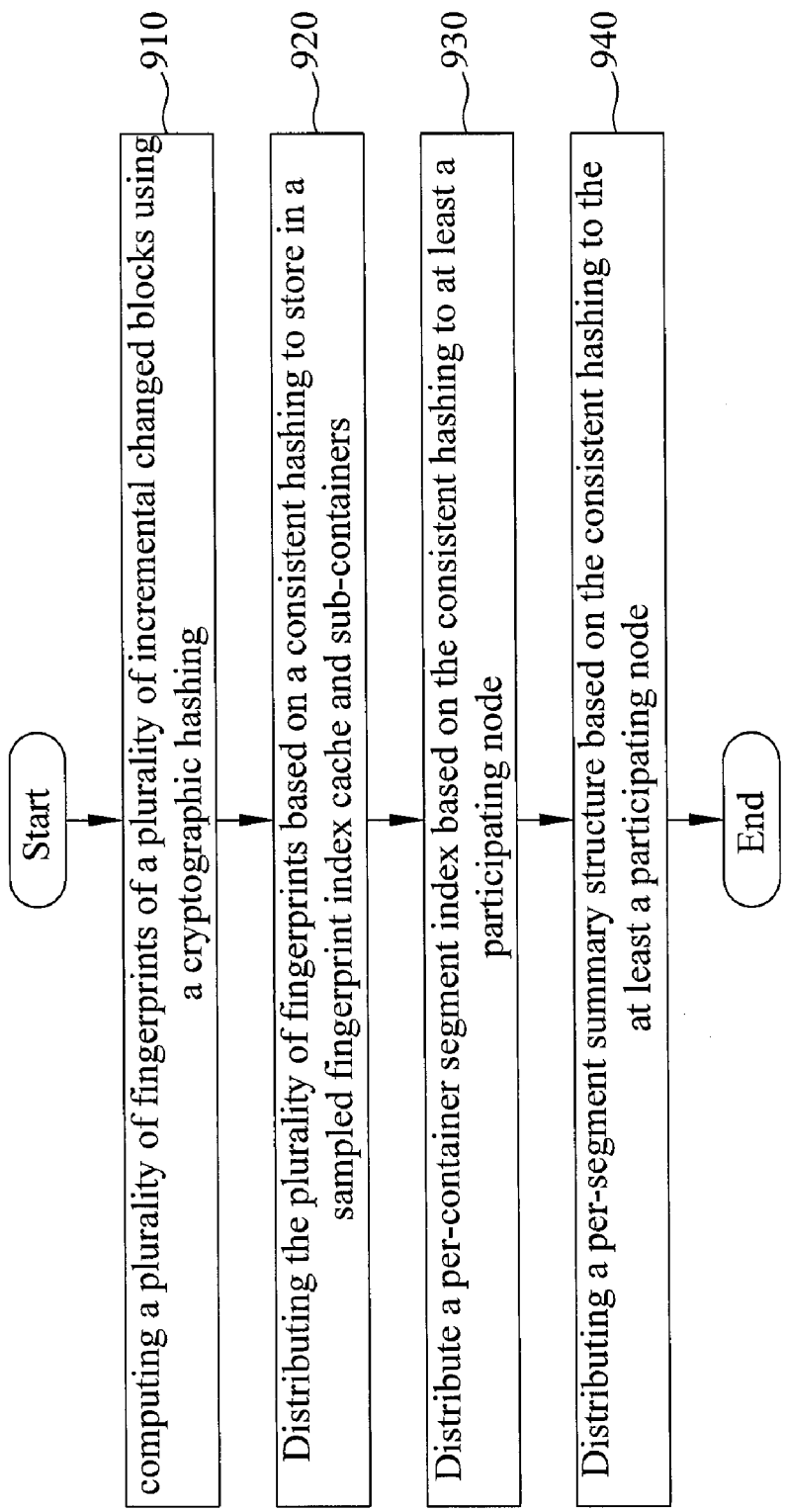
FIG. 9 shows an exemplary operation flow of parallel de-duplication, consistent with certain disclosed embodiments.

FIG. 9 shows an exemplary operation flow of parallel de-duplication, consistent with certain disclosed embodiments. Referring to FIG. 9, exemplary operation flow 900 may comprise: computing a plurality of fingerprints of a plurality of incremental changed blocks using a cryptographic hashing (step 910); distributing the plurality of fingerprints based on a consistent hashing to store in a sampled fingerprint index cache and sub-containers (step 920); distributing a per-container segment index based on the consistent hashing to at least a participating node (step 930), so that the segment index on each data node (slave device) may have a smaller offset pair; and distributing a per-segment summary structure based on the consistent hashing to the at least a participating node (step 940). The at least a participating node may be different data nodes on a data node side. The consistent hashing may be a well-known consistent hashing.

Figure 10:
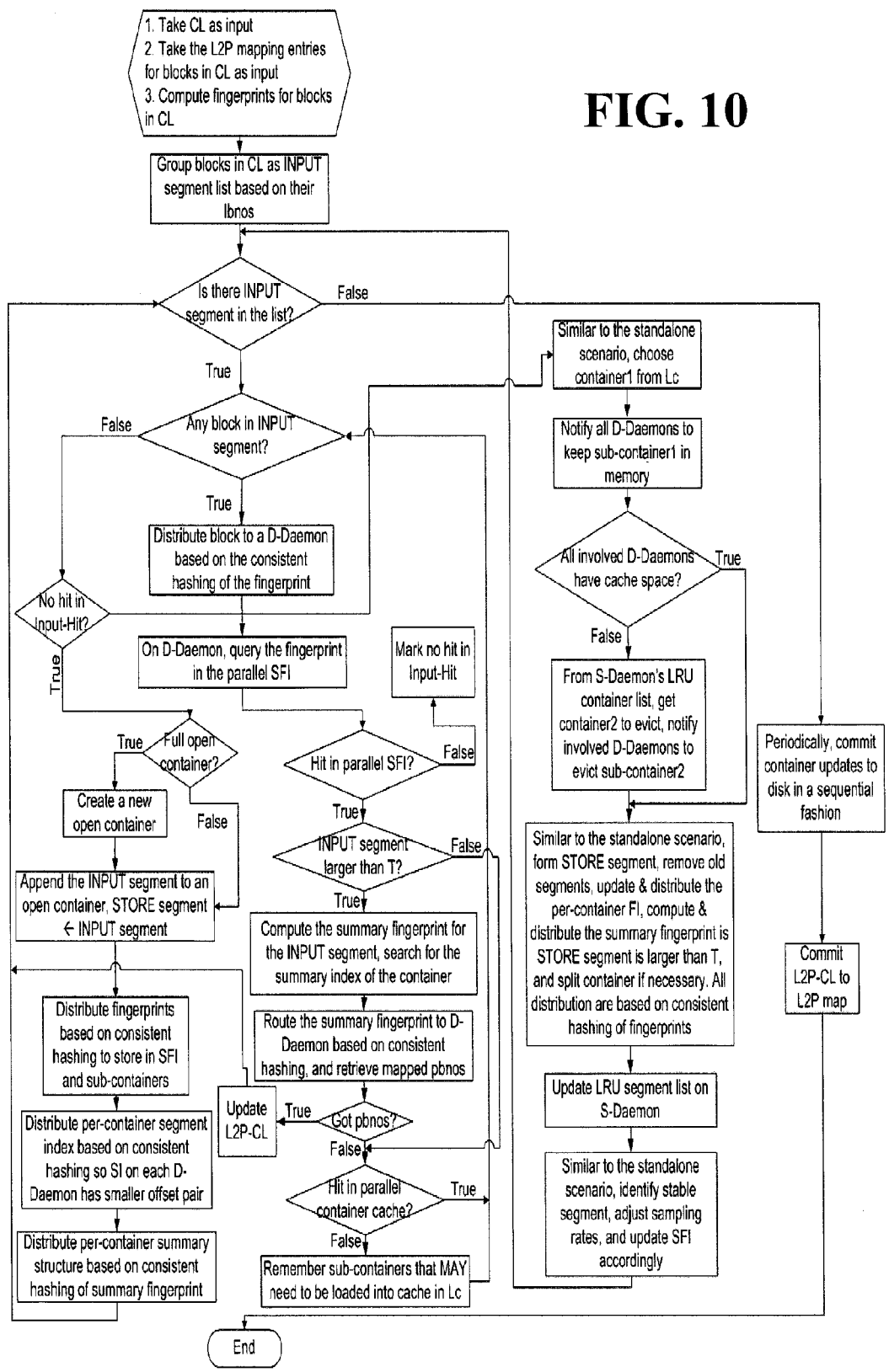
FIG. 10 shows a working example illustrating a detailed operation flow for FIG. 9, consistent with certain disclosed embodiments.

Step 910 may further include, for example, grouping the plurality of incremental changed blocks in the change list as an input segment list, the at least a participating node may query the fingerprint in the sampled fingerprint index cache, and so on. During the parallel de-duplication, the loading and eviction of the container cache may also need the help from the at least a participating node. These detailed operating sub steps may be found in the working example of FIG. 10, which illustrates a detailed operation flow for FIG. 9 and on how the participating node gives the needed help, consistent with certain disclosed embodiments. Description for other detailed sub steps in FIG. 10 is already mentioned above and will be omitted here.

In summary, the disclosed exemplary embodiments may provide a scalable segment-based data de-duplication (D-Dedup) system and method for incremental backup storage systems, to improve the de-duplication throughput with minimal impact on DDR based on segment, via the schemas of per-segment summary fingerprints in a container for incremental changes, varied sampling rates of segments, a per-segment summary structure, and distributed de-duplication to participating nodes.

Although the disclosed has been described with reference to the exemplary embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A scalable segment-based data de-duplication system for incremental backups, comprising:
a master device on a secondary-storage node side that receives at least a plurality of incremental changes, a plurality of fingerprints of a plurality of segments to be de-duplicated, mapping entities from logical block address to physical location;
wherein said master device further includes at least a distributer to distribute at least a de-duplication functionality to at least a slave device on a data node side, and performs data de-duplication on said plurality of segments via a way to cluster a plurality of fingerprints in a range and content-based locality-preserved fingerprint container for said plurality of incremental changes, varied sampling rates for said plurality of segments, and a per-segment summary structure to avoid unnecessary inputs or outputs involved in de-duplication.

2. The system as claimed in claim 1, said system further includes said at least a slave device, and performs parallel de-duplication to leverage computing power of said at least a slave device.

3. The system as claimed in claim 2, wherein each of said at least a slave device further includes:
a fingerprint manager for maintaining said fingerprint cache except the replacement of fingerprints; and
a container manager for maintaining said container cache except the replacement of containers.

4. The system as claimed in claim 3, wherein each of said at least a slave device further includes a container updater for writing of a plurality of sub-containers on a local data node.

5. The system as claimed in claim 2, wherein the parallel de-duplication is segment-based de-duplication, and is based on consistent hashing of each of input fingerprints to a data node on said data node side.

6. The system as claimed in claim 1, wherein a plurality of fingerprint containers are stored and retrieved from said secondary-storage node side in a distributed fashion, and a fingerprint cache and a container cache are also distributed and partitioned in different data nodes.

7. The system as claimed in claim 1, wherein said container is based on a plurality of pseudo-physical block addresses to preserve data locality in per-volume logical block address and differentiate block addresses from different volumes.

8. The system as claimed in claim 1, wherein said per-segment summary structure is accomplished by the followings:
each of said plurality of segments larger than a threshold having a whole-segment fingerprint; and
matching of said whole-segment fingerprint indicating that de-duplication within the segment is done and no individual block fingerprint within the segment needs to be checked.

9. A scalable segment-based data de-duplication system for incremental backups, comprising:
a master device on a secondary-storage node side that receives at least a plurality of incremental changes, a plurality of fingerprints of a plurality of segments to be de-duplicated, mapping entities from logical block address to physical location;
wherein said master device further includes at least a distributer to distribute at least a de-duplication functionality to at least a slave device on a data node side, and performs data de-duplication on said plurality of segments via a way to cluster a plurality of fingerprints in a data locality unit called container for said plurality of incremental changes, varied sampling rates for said plurality of segments, and a per-segment summary structure to avoid unnecessary inputs or outputs involved in de-duplication; wherein said varied sampling rates are based on a least recently used order.

10. A scalable segment-based data de-duplication system for incremental backups, comprising:
a master device on a secondary-storage node side that receives at least a plurality of incremental changes, a plurality of fingerprints of a plurality of segments to be de-duplicated, mapping entities from logical block address to physical location;
wherein said master device further includes at least a distributer to distribute at least a de-duplication functionality to at least a slave device on a data node side, and performs data de-duplication on said plurality of segments via a way to cluster a plurality of fingerprints in a data locality unit called container for said plurality of incremental changes, varied sampling rates for said plurality of segments, and a per-segment summary structure to avoid unnecessary inputs or outputs involved in de-duplication, and wherein said at least a distributer further includes:
   a fingerprint distributer that hashes each of said plurality of fingerprints for determining a destination data node, and waits for a response from said destination data node; and
   a container distributer that stripes a conceptual container as a plurality of sub-containers using a consistent hashing so that container stripes, a fingerprint cache and a container cache reside on a same data node.

11. The system as claimed in claim 10, wherein said conceptual container is striped into N files, N is the number of data nodes on said data node side, and each of N data nodes is responsible to store one stripe of said conceptual container, and one stripe of said conceptual container is denoted as a sub-container.

12. The system as claimed in claim 10, wherein said master device further includes a replacement engine to store at least a least recently used list for a fingerprint cache and a container cache to replace containers and fingerprints centrally on said master device.

13. The system as claimed in claim 10, wherein said master device further includes a mapping updater to map at least a metadata from logical block address to physical location of a plurality of blocks based on output of the de-duplication.

14. The system as claimed in claim 10, wherein said master device further includes a unit detector to detect said conceptual container of the input fingerprints on the fly or recognize the boundary of a de-duplication unit over time.

15. A scalable segment-based data de-duplication method for incremental backups, executed by a master device on a secondary-storage node side, and comprising:
   receiving at least a plurality of incremental changes, a plurality of fingerprints of a plurality of input segments to be de-duplicated, mapping entities from logical block address to physical location;
   clustering said plurality of fingerprints in a range and content-based locality-preserved fingerprint container for the incremental changes;
   assigning varied sampling rates for said plurality of segments; and
   constructing a per-segment summary structure to avoid unnecessary inputs or outputs involved in the data de-duplication.

16. The method as claimed in claim 15, wherein said method further includes:
   performing parallel de-duplication by at least a distributer of said master device to leverage computing power of at least a participating node on a data node side.

17. The method as claimed in claim 16, wherein said parallel de-duplication further includes:
   computing a plurality of fingerprints of a plurality of incremental changed blocks using a cryptographic hashing;
   distributing said plurality of fingerprints of said plurality of incremental changed blocks based on a consistent hashing to store in a sampled fingerprint index cache and a plurality of sub-containers;
   distributing a per-container segment index based on said consistent hashing to at least a participating node; and
   distributing said per-segment summary structure based on said consistent hashing to said at least a participating node.

18. A scalable segment-based data de-duplication method for incremental backups, executed by a master device on a secondary-storage node side, and comprising:
   receiving at least a plurality of incremental changes, a plurality of fingerprints of a plurality of input segments to be de-duplicated, mapping entities from logical block address to physical location;
   clustering said plurality of fingerprints in a data locality unit called container for the incremental changes;
   assigning varied sampling rates for said plurality of segments; and
   constructing a per-segment summary structure to avoid unnecessary inputs or outputs involved in the data de-duplication;
   wherein said method further includes:
   partitioning said plurality of incremental changes of a plurality of blocks as said plurality of input segments;
   querying an in-memory sampled fingerprint index for each fingerprint in each of said plurality of input segments, and returning with a pair of container ID and segment ID;
   when there is a stored segment the same as the input segment, then querying an in-memory segment-based summary with said pair of container ID and segment ID to determine if a corresponding container is fetched in, otherwise, query an in-memory container store cache to determine if said corresponding container is cached; and
   loading said corresponding container from an on-disk container store when it is not cached, and querying a per-container segment index for an offset of a particular fingerprint routed to said corresponding container for retrieving the segment information of said particular fingerprint.

19. A scalable segment-based data de-duplication method for incremental backups, executed by a master device on a secondary-storage node side, and comprising:
   receiving at least a plurality of incremental changes, a plurality of fingerprints of a plurality of input segments to be de-duplicated, mapping entities from logical block address to physical location;
   clustering said plurality of fingerprints in a data locality unit called container for the incremental changes;
   assigning varied sampling rates for said plurality of segments; and
   constructing a per-segment summary structure to avoid unnecessary inputs or outputs involved in the data de-duplication;
   wherein a basic sharing unit (BSU) segment is defined as a store segment that does not get modified after its creation, and said varied sampling rates of said plurality of input segments are accomplished by sampling only one fingerprint of each of BSU segments of said plurality of input segments, and assigning different sampling rates for other non-BSU segments.

20. A scalable segment-based data de-duplication method for incremental backups, executed by a master device on a secondary-storage node side, and comprising:
   receiving at least a plurality of incremental changes, a plurality of fingerprints of a plurality of input segments to be de-duplicated, mapping entities from logical block address to physical location;
   clustering said plurality of fingerprints in a data locality unit called container for the incremental changes;
   assigning varied sampling rates for said plurality of segments; and
   constructing a per-segment summary structure to avoid unnecessary inputs or outputs involved in the data de-duplication;
   wherein said method further includes:
   performing parallel de-duplication by at least a distributer of said master device to leverage computing power of at least a participating node on a data node side;

wherein said parallel de-duplication further includes:
computing a plurality of fingerprints of a plurality of incremental changed blocks using a cryptographic hashing;
distributing said plurality of fingerprints of said plurality of incremental changed blocks based on a consistent hashing to store in a sampled fingerprint index cache and a plurality of sub-containers;
distributing a per-container segment index based on said consistent hashing to at least a participating node; and
distributing said per-segment summary structure based on said consistent hashing to said at least a participating node; and
wherein said per-segment summary structure is distributed and partitioned to said at least a participating node on said data node side, and said plurality of sub-containers are stored in said at least a participating node.

* * * * *